US006799094B1

(12) United States Patent
Vaida et al.

(10) Patent No.: US 6,799,094 B1
(45) Date of Patent: Sep. 28, 2004

(54) AIRCRAFT LOCATION MONITORING SYSTEM AND METHOD OF OPERATION

(75) Inventors: Theodore F. Vaida, Lafayette, CO (US); Andrew M. McKenna, Boulder, CO (US)

(73) Assignee: Ridgeback Systems LLC, Boulder, CO (US)

( * ) Notice: Subject to any disclaimer, the term of this patent is extended or adjusted under 35 U.S.C. 154(b) by 0 days.

(21) Appl. No.: 10/233,633

(22) Filed: Sep. 3, 2002

(51) Int. Cl.[7] .................................................. G01S 5/02

(52) U.S. Cl. ...................... 701/3; 701/213; 342/357.07; 342/357.09

(58) Field of Search .............................. 701/3, 33, 213, 701/120, 29; 342/357.07, 357.09, 357.1; 340/992, 539.13, 539.16, 539.17, 539.24

(56) References Cited

U.S. PATENT DOCUMENTS 5,517,199 A * 5/1996 DiMattei ............... 342/357.09
6,292,724 B1 * 9/2001 Apsell et al. ................. 701/29
6,429,810 B1 * 8/2002 De Roche .............. 342/357.07
6,502,030 B2 * 12/2002 Hilleary ...................... 701/207
6,509,867 B1 * 1/2003 McGibney ............. 342/357.07
6,542,076 B1 * 4/2003 Joao .......................... 307/10.2
6,549,162 B1 * 4/2003 Gage et al. ................. 342/353
6,587,790 B1 * 7/2003 Arnold ....................... 701/213
6,641,087 B1 * 11/2003 Nelson .................... 244/118.5
6,691,956 B1 * 2/2004 Waterman ................... 244/189
2003/0071743 A1 * 4/2003 Seah et al. .................. 340/945

* cited by examiner

*Primary Examiner*—Michael J. Zanelli
(74) *Attorney, Agent, or Firm*—Edwin H. Crabtree; Ramon L. Pizarro; Donald W. Margolis

(57) ABSTRACT

An aircraft monitoring system adapted for mounting in an aircraft and at a location independent of the aircraft for providing information related to aircraft location and/or the current state of the operation of the aircraft. The monitoring system includes an aircraft-tracking device and a server computer adapted for communicating with an aircraft owner/operator. The device includes a signal receiving antenna for receiving signals from a satellite positioning system and a decoder connected to the antenna for decoding the location position coordinates (GPS or GLONASS). Further, the aircraft-tracking device includes a microprocessor connected to the decoder and a two-way satellite communication transceiver. The transceiver is connected to a two-way radio communication antenna. The radio communication antenna receives and sends two-way satellite communications between a satellite communication system. The satellite communication system communicates with a ground-based satellite communication service. The server computer is connected to the satellite communication service and is connected to a telecommunication system for alerting the owner/operator as to the aircraft's location and/or the current state of operation.

15 Claims, 4 Drawing Sheets

20 24 22 26 18 28 10 16 12 30 32 38 14 34 36 40

AIRCRAFT LOCATION MONITORING SYSTEM AND METHOD OF OPERATION

BACKGROUND OF THE INVENTION (a) Field of the Invention

This invention relates to aircraft security and more particularly, but not by way of limitation, to an aircraft location monitoring system for alerting an owner/operator that an aircraft is in operation and providing the owner/operation continuous information related to the location of an aircraft, should the aircraft be stolen or hijacked.

(b) Discussion of Prior Art

Heretofore, there have been a number of patents related to tracking of lost or missing vehicles. In U.S. Pat. No. 6,321,091 to Holland, a portable tracking and locating system is disclosed. The system includes a locator device connected to a cellular modem for receiving positional data. The system also includes a telecommunication provider, server computer and subscriber computer. In U.S. Pat. No. 5,418,537 to Bird, a method and apparatus for locating a missing vehicle is described using GPS signals from two or more GPS satellites. In U.S. Pat. No. 5,532,690 to Hertel, an apparatus and method of monitoring and bounding a path of a ground vehicle is disclosed using ground position coordinates from a GPS receiver. Also, U.S. Pat. No. 5,365,451 to Wang et al. and U.S. Pat. No. 6,313,791 to Klanke disclose complex control and tracking systems for vehicles using computers and GPS satellite positioning systems.

None of the above mentioned prior art patents specifically disclose the unique features, combination of components and function of the subject aircraft location monitoring system as described herein.

SUMMARY OF THE INVENTION

In view of the foregoing, it is a primary objective of the subject invention to provide an owner/operator of an aircraft with information related to the location of the aircraft and the current state of operation of the aircraft. The owner/operator is at a location independent of the aircraft. The invention can monitor engine startup, electrical system power up or loss of power, opening and closing of doors and windows, G-force and like conditions of the plane.

Another object of the invention is when the aircraft is airborne, a GPS satellite positioning system will provide the owner/operator with position coordinates of the aircraft. The monitoring system can also provide airspeed, altitude and other environmental factors at regular predetermined intervals. The monitoring system can be programmed to provide continuous tracking of the aircraft or can be programmed to be on standby and provide location requests at regular intervals.

Still another object of the invention is the monitoring system can be connected to a variety of telecommunication systems belonging to the owner/operator, such as internet e-mail, text paging systems, synthesized voice telephone, facsimile and other electronic mediums.

Yet another object of the invention is the monitoring system can be easily adapted for monitoring the location and operation of other transportation vehicles such as ships, trucks and other vehicles requiring monitoring outside the coverage of cellular communications.

The aircraft monitoring system is adapted for mounting in an aircraft and at a location independent of the aircraft for providing information related to aircraft location and/or the current state of the operation of the aircraft. The monitoring system broadly includes an aircraft-tracking device adapted for mounting on the aircraft and a server computer adapted for communicating with an aircraft owner/operator.

The aircraft-tracking device includes a signal antenna adapted for mounting on the aircraft and adapted for receiving radio frequency signals from a GPS satellite positioning system. The aircraft-tracking device also includes a GPS decoder connected to the radio signal antenna for decoding the location position coordinates received from the GPS satellite positioning system. Further, the aircraft-tracking device includes a microprocessor with a non-volatile memory connected to the decoder and a two-way satellite communication transceiver. The transceiver is connected to a signal receiving antenna. The signal receiving antenna is adapted for transmitting and receiving two-way satellite communications with a satellite communication system. The satellite communication system is adapted for using ground stations to connect the aircraft-tracking device to the server computer either directly or via a telecommunications service such as the internet.

The server computer is a microprocessor with a commercial operating software system. The computer is adapted for receiving two-way aircraft operation data transmissions via the satellite communication service. The server computer is adapted for connection by a telecommunication system to the owner/operator and alerting the owner/operator as to the aircraft's location and/or the current state of operation of the aircraft.

These and other objects of the present invention will become apparent to those familiar with various types vehicle monitoring systems and the use position coordinates from GPS satellite positioning system and communicating with a two-way satellite communication system when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
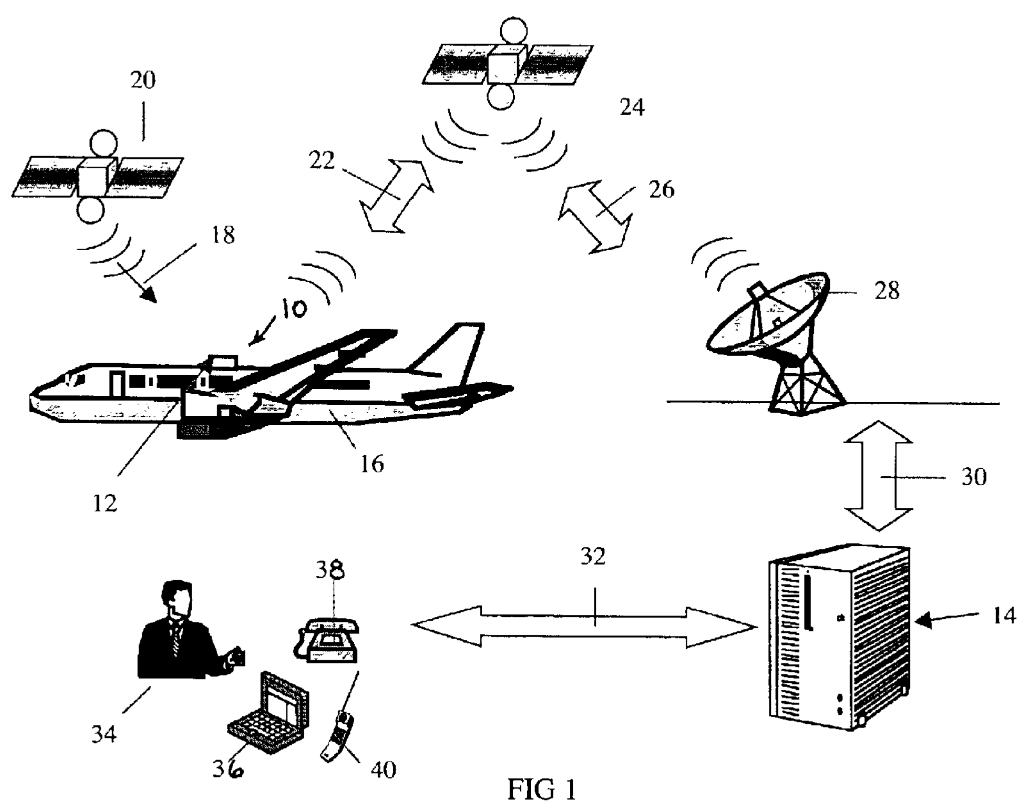
FIG. 1 is a diagram of the subject aircraft monitoring system shown communicating with the GPS satellite positioning system, a two-way communication satellite positioning system and an owner/operator's telecommunication equipment.

In FIG. 1, the aircraft monitoring system is shown having general reference numeral 10. Broadly, the monitoring system 10 includes an aircraft-tracking device having a general reference numeral 12 and a server computer having a general reference numeral 14.

In this drawing, the aircraft-tracking device 12 is shown mounted on an aircraft 16 for receiving GPS position coordinates, as indicated by arrow 18, from a satellite positioning system 20, this may be the GPS system provided by USDOD, GLONASS provided by Russia, or any other positioning system based on radio frequency signals provided by a satellite. The aircraft-tracking device 12 is also shown with two-way radio communication, indicated by arrow 22, with a satellite communication system 24. The satellite communication system 24 is in two-way radio communication, indicated by arrow 26, with a ground-based satellite communication service 28. The satellite communication service 28 is connected via a telecommunication line, as indicated by arrow 30, with the system's server computer 14. The server computer 14 is connected via a telecommunication line, as indicated by arrow 32, to a customer or an owner/operator 34 of the aircraft 16. The owner/operator 34 can use a computer 36 with internet e-mail, a telephone 38, a pager 40 or any other telecommunication device for connection to the line 32 for alerting him or her of the current location and operation status of the aircraft 16.

Figure 2:
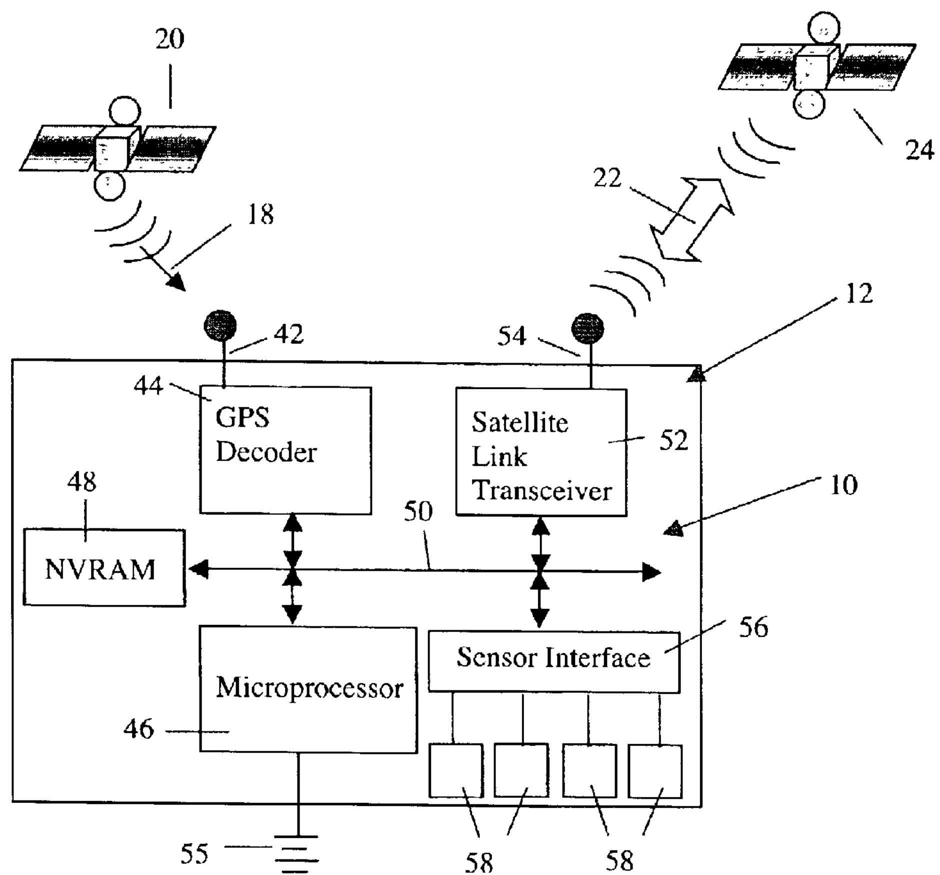
FIG. 2 is a block diagram of the individual components of the monitoring system's aircraft-tracking device with antennas for communication with the GPS satellite positioning system and the two-way communication satellite positioning system.

In FIG. 2, the aircraft-tracking device 12 is shown including a signal receiving antenna 42 adapted for mounting on the aircraft 16 and adapted for receiving the location position coordinates 18 from the GPS satellite positioning system 20. Also, the aircraft-tracking device 12 includes a decoder 44 connected to the signal receiving antenna 42 for decoding the location position coordinates 18 received from the GPS satellite positioning system 20. Further, the aircraft-tracking device 12 includes a microprocessor 46 with a non-volatile memory 48 connected via a system bus 50 to the decoder 44 and to a two-way satellite communication transceiver 52. The microprocessor 46 and the memory 48 are equipped to execute arbitrary software programs as described under FIG. 3. The transceiver 52 is connected to a two-way radio communication antenna 54. The two-way radio communication antenna 54 is mounted on the aircraft 16 and is adapted for receiving and sending the two-way satellite communications 22 from the satellite communication system 24. While the two antennas 42 and 54 are shown separately in the drawings, it can be appreciated at they can be incorporated into a single antenna for performing the necessary functions described herein.

The microprocessor 46 is connected to a power source 55 and is designed to "sleep" when power savings is needed and the aircraft monitoring system 10 is inactive. The power source 55 may be a rechargeable battery and/or connected to the aircraft's electrical system. The power source 55 will draw and store power from the aircraft's electrical system for use when the aircraft is powered "off". When the aircraft-tracking device 12 is running independently of the aircraft electrical system, power related information will be provided to the sensor interface 56 so that power saving measures can be taken if necessary.

The system bus 50 is connected to a sensor interface 56. The sensor interface 56 is connected to a plurality of sensors 58, which are located on the aircraft 16. The sensor interface 56 is designed to monitor and decode information from the individual sensors 58. One of the sensors 58, for example, can be a contact switch for indicating when an aircraft door or window is opened. Another sensor 58 can be a voltage sensor for determining the state of the aircraft's electrical system. Yet another sensor 58 can be a starter contact switch for indicating the start up of the aircraft's engines. Still another sensor 58 can be a motion sensor to indicate movement of persons inside the aircraft when it is on the ground. Obviously, any number of sensors 58 can be mounted on or inside the aircraft 16 for monitoring it's operation. The sensor interface 56 can be programmed to operate continuously for monitoring the state of the sensors 58 and communicate, via the system bus 50, with the microprocessor 46 and "wake" the aircraft-tracking system 12 for sending an alert to the owner/operator 34.

Figure 3:
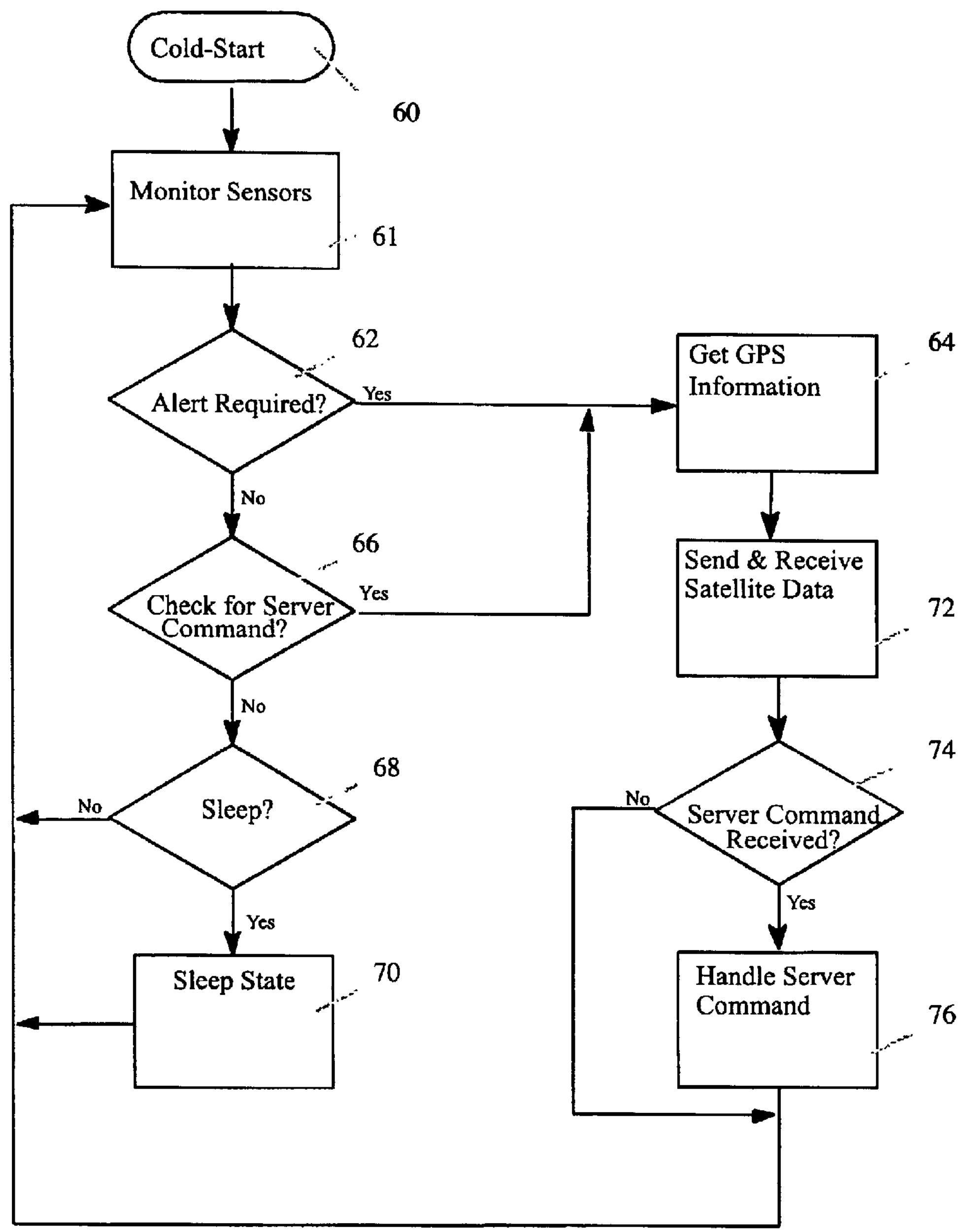
FIG. 3 is a flow diagram illustrating the software and hardware used in the operation of the aircraft-tracking device shown in FIG. 2.

In FIG. 3, a flow diagram illustrating the software and hardware used in the operation of the aircraft-tracking device 12 is shown. The device 12 begins at a power up or Cold-Start state 60. At this time, the microprocessor 46 is initialized and the software is loaded from the non-volatile memory 48. Also loaded from the non-volatile memory 48 is any state information received from past operations of the system 10 including configuration information sent from the server computer 14.

The microprocessor 46 now samples the Check Sensor Interface 61. If the state of one or more of the sensors 58 connected to the sensor interface 56 has changed, this information is captured by the microprocessor 46. The microprocessor 46 then uses the stored configuration information to determine if the state information captured indicates that an Alert Required 62 should be sent. If Alert Required 62 is "Yes", the step of Get GPS Information 64 begins.

If Alert Required 62 is negative or "No", the stored configuration information now goes to the step of Check for Server Command 66, which determines if the satellite link transceiver 52 should be activated to listen for commands from the server computer 14. If the satellite link transceiver 52 should be activated or the command is "Yes", then Get GPS Information 64 proceeds.

If the Check Server Command 66 is "No", then the microprocessor 46 checks the configuration information to determine if a low power or Sleep 68 is required. If "Yes", the device 12 enters a power down mode or Sleep State 70 for a pre-determined length of time.

When the Get GPS Information 64 state is activated, the GPS antenna 42 receives aircraft position coordinate information from the GPS satellite positioning system 20 for being decoded by the GPS decoder 44. The decoded information, now in a Send & Receive Satellite Data 72 state, is sent via the transceiver 52 and two-way radio communication antenna 54 to the satellite communication system 24 and then via the ground-based satellite communication service 28 to the server computer 14. The aircraft-tracking device 12 is now in a Server Command Received 74 state listening for incoming commands and instructions from the server computer 14. If this state is true and is "Yes", the microprocessor enters into a Handle Server Command 76 state for handling the incoming commands. If the state is "No" and no response is received from the server computer 14, the device 12 returns to a standby or sleep mode.

Figure 4:
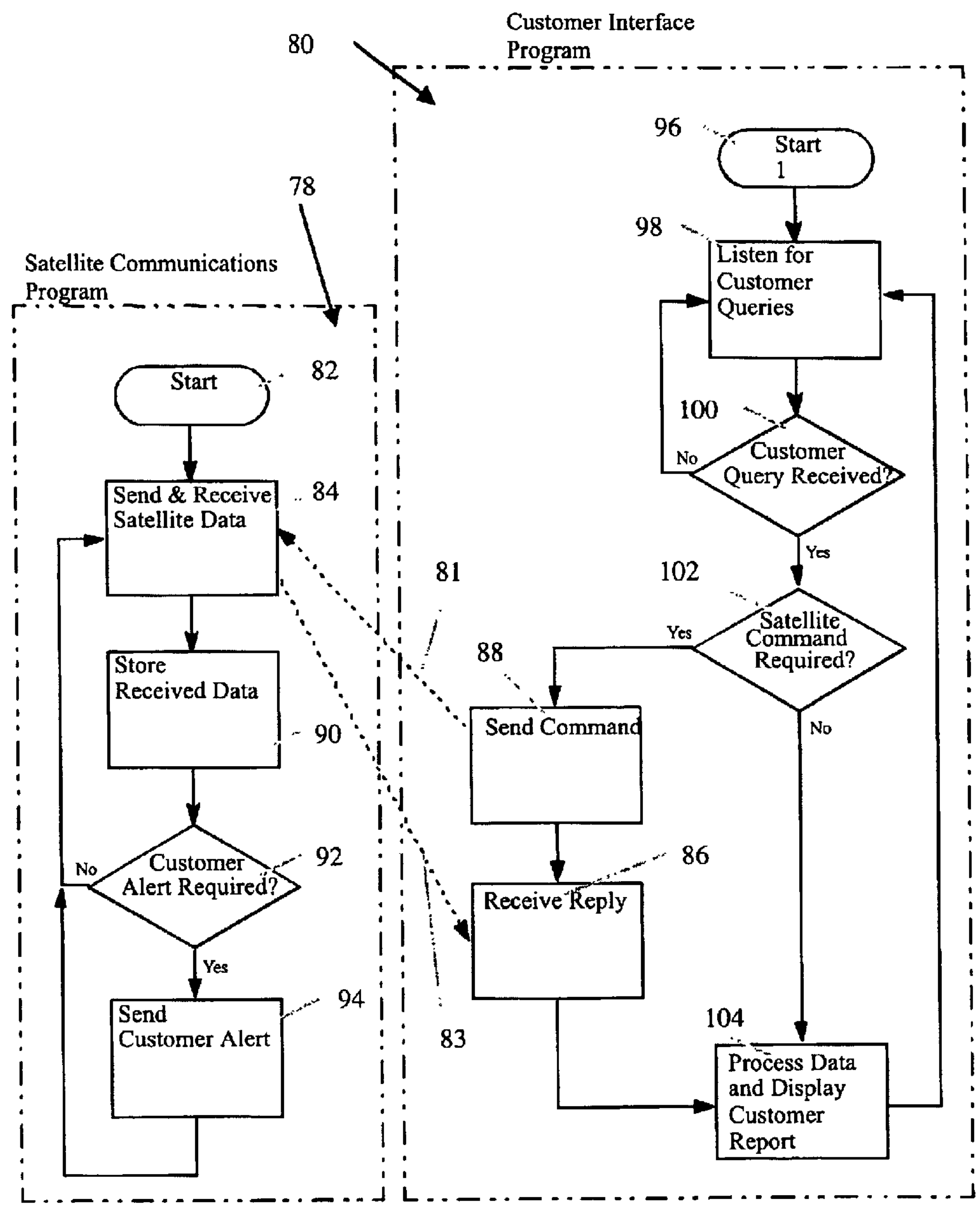
FIG. 4 is another flow diagram illustrating the software used in the operation of the system's server computer.

In FIG. 4, a flow diagram illustrating the software and hardware used in the operation of the server computer 14 is described. The software consists of two separate programs, a satellite communication program, having general reference numeral 78 and surrounded by dashed lines, and a customer interface program, having general reference numeral 80 and surrounded by dashed lines. Each program 78 and 80 can communicate with each other through the use of a queue or other inter-process communication methods. In the drawings, the queue is indicated by a send command arrow 81 and a receive reply arrow 83. It should be mentioned that the two programs 78 and 80 can operate using separate microprocessors in a single microcomputer or can operate using separate microcomputers.

The satellite communication program 78 provides the transmission and receipt of data from the aircraft 16, via the satellite communication system 24 and the ground-based satellite communication service 28. Also, the program 78 generates general alerts to the owner/operator 34. The program 78 starts with a Start Up 82 state and the program is loaded and begins running on the server computer 14. The program enters a Send & Receive Satellite Data 84 state from the satellite communication link. Any incoming data to the customer interface program 80 is copied and sent via the receive reply arrow 83 to a Receive Reply 86 state. Data queued from the customer interface program 80 is sent back through the satellite communications link from a Send Command 88 state via the send command arrow 81.

The data received by the program 78 is stored in a Store Received Data 90 state, which is a perpetual database for later processing. From the Store Received Data 90 state, the program proceeds to a Customer Alert Required? 92 state. If an alert is required or "Yes", a Send Customer Alert 94 state is executed and the owner/operator 34 is contacted via telecommunication line 32. The owner/operator 34 can now gather information using the customer interface program 80. If no alert or "No" is required, the program returns to the Send & Receive Satellite Data 84 state.

The Customer Interface Program 80 begins with the State Up 96 state and the program is loaded and begins running on the server computer 14. The program 80 begins by Listen for Customer Queries 98 state and listens for requests from one or more owner/operator 34 requests as to the location and operation of aircrafts equipped with the subject aircraft monitoring systems 10.

If no queries from the Customer Query Received? 100 state are received than the status is "No" and the program 80 continues to listen for requests. If a query is received and the status is "Yes", the program advances to Satellite Command Required 102 state and it is determined if a command needs to be sent to the customer or the owner/operator 34 to satisfy the request. If this is true or "Yes", then Send Command 415 state requests satellite data on the location and operation of the aircraft. The location and operation information is transmitted via send command arrow 81 and using the inter-process communications between the two programs 78 and 80 as discussed above.

If the test at Satellite Command Required 102 is "No", the customer query is satisfied by data stored in the perpetual database and the program advances to Process Data and Display Customer Report 104. This report processes data from the perpetual database and any data received in reply to a server command to generate the report requested by the customer query. Once the report is completed and sent to the customer, the program 80 proceeds back to the Listen for Customer Queries 98 state and the process is now ready to repeat itself.

The following are two examples, from any number of examples, using of the subject aircraft monitoring system 10. They are:

Example 1. An owner of a light piston aircraft keeps his aircraft stored at a remote airport having no airport security. The aircraft has the subject aircraft-tracking device 12 installed therein and is connected via a satellite positioning system link to a remote server computer 14 for monitoring the aircraft. The server computer 14 is connected to the owner's cell phone, pager, telephone, etc. The server computer 14 has been programmed so that when a master switch in the aircraft is turned "on", the owner receives a text page with half hour coordinate updates when the aircraft is in motion. On night, a thief cuts a lock on the aircraft's hanger and rolls the aircraft out and starts it's engine. The owner is awaken by the server computer 14 and reports the stolen plane. The thief is able to get the aircraft airborne, but with the tracking information from the aircraft-tracking device 12 and the server computer 14, the thief is apprehended when he lands at an unmarked rural airstrip.

Example 2. An owner of a fleet of small jet aircraft installs the aircraft-tracking device 12 in each of the jets. Each of the devices 12 are connected to a satellite positioning system link and a remote server computer 14. The server computer 14 is connected to the owner's computer via e-mail and the owner's telephone and wireless telephone system for system alerts to the owner's 24 hour dispatcher. The owner's computer receives 5-minute updates from the server computer 14 whenever any of the jets are airborne. A terrorist cell purchase an interest in one of the owner's aircraft. Several members of the terrorist cell board a plane in Denver with a stated destination of Boise, Id. During the flight, the crew is overwhelmed and the hijackers divert the flight to California ostensibly for the purpose of crashing the aircraft into a bridge or building in San Francisco. The dispatcher notices the discrepancy on a visual map, which shows the expected track and the actual flight path. This information being provided from the server computer 14. After the dispatcher is unable to contact the crew of the plane, he informs the FAA of the hijacked aircraft and requests assistance.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A passive aircraft monitoring system adapted for mounting in an aircraft and at a location independent of the aircraft for providing information via a telecommunication system to an aircraft owner/operator and related to aircraft location and the current state of the operation of the aircraft, the monitoring system using a satellite positioning system, a satellite communication system and a ground-based satellite communication service, the monitoring system comprising:

an aircraft-tracking device adapted for mounting in the aircraft, said device including a microprocessor for processing information related to aircraft location and state of operation of the aircraft;

a sensor interface connected to said microprocessor and a first sensor connected to said sensor interface, said first sensor for starting said sensor interface and said microprocessor when the aircraft has gone from being out of operation to being in operation, said sensor interface operating continuously during the operation of the aircraft and monitoring the state of said first sensor;

means for receiving radio frequency signals from the satellite positioning system connected to said microprocessor, said means for receiving radio frequency signals adapted for decoding the position coordinates from the satellite positioning system;

means for communicating with the satellite communication system and the ground-based satellite communication service and connected to said microprocessor; and a server computer adapted for receiving the position coordinates from said microprocessor via the satellite communication system and the ground-based satellite communication service, said server computer adapted for connection to the telecommunication system for providing non-invasive information to the owner/operator as to the aircraft's location and the current state of operation.

2. The monitoring system as described in claim 1 wherein said means for receiving the aircraft position coordinates is a signal receiving antenna and a satellite positioning system decoder, said antenna and said decoder attached to said microprocessor.

3. The monitoring system as described in claim 1 wherein said means for communicating with the satellite communication system and ground-based communication service is a two-way satellite communication transceiver and a two-way radio frequency antenna, said two-way satellite communication transceiver and said two-way radio frequency antenna connected to said microprocessor.

4. The monitoring system as described in claim 1 wherein said server computer includes a satellite communication program adapted for receiving the position coordinates from said microprocessor and connected to the telecommunication system for alerting the owner/operator and said server computer includes a customer interface program connected to said satellite communication program, said customer interface program adapted for listening for requests from one or more owner/operators as to aircraft locations and current state of operation.

5. The monitoring system as described in claim 1 wherein said first sensor is a voltage sensor adapted for connecting to an electrical system of the aircraft, said first sensor starting said sensor interface and said microprocessor when the electrical system is turned on.

6. The monitoring system as described in claim 1 wherein said first sensor is a starter contact switch adapted for connecting to an aircraft engine of the aircraft, said first sensor starting said sensor interface and said microprocessor when the aircraft engine is turned on.

7. A passive aircraft monitoring system adapted for mounting in an aircraft and at a location independent of the aircraft for providing information via a telecommunication system to an aircraft owner/operator and related to aircraft location and the current state of the operation of the aircraft, the monitoring system using a satellite positioning system, a satellite communication system and a ground-based satellite communication service, the monitoring system comprising:

an aircraft-tracking device adapted for mounting in the aircraft, said device including a signal receiving antenna adapted for receiving location position coordinates from the satellite positioning system, said device including a satellite positioning system decoder connected to said signal receiving antenna for decoding the location position coordinates, said device including a microprocessor connected to said decoder, connected to a two-way satellite communication transceiver and connected to a two-way satellite communication antenna, said two-way satellite communication antenna adapted for receiving two-way satellite communications with the satellite communication system, which is adapted for communication with the ground-based satellite communication service;

a sensor interface connected to said microprocessor and a first sensor and a second sensor, said first and second sensors connected to said sensor interface, said first and second sensors for starting said sensor interface and said microprocessor when the aircraft has gone from being out of operation to being in operation, said sensor interface operating continuously during the operation of the aircraft and monitoring the state of said first and second sensors; and a server computer adapted for receiving two-way aircraft operation data transmissions from the ground-based satellite communication service, said server computer adapted for connection to the telecommunication system for providing non-invasive information to the owner/operator as to the aircraft's location and the current state of operation.

8. The monitoring system as described in claim 7 wherein said server computer includes a satellite communication program adapted for receiving the position coordinates from said microprocessor and connected to the telecommunication system for alerting the owner/operator and wherein said server computer includes a customer interface program connected to said satellite communication program, said customer interface program adapted for listening for requests from one or more owner/operators as to aircraft locations and current state of operation.

9. The monitoring system as described in claim 8 wherein said customer interface program is adapted for providing periodic updates of an aircraft location and aircraft operation.

10. The monitoring system as described in claim 8 wherein said customer interface program is adapted for providing continuous updates of aircraft location and aircraft operation when the aircraft is in flight.

11. The monitoring system as described in claim 7 wherein said first sensor is a voltage sensor adapted for connecting to an electrical system of the aircraft, said first sensor starting said sensor interface and said microprocessor when the electrical system is turned on.

12. The monitoring system as described in claim 11 wherein said second sensor is a starter contact switch adapted for connecting to an aircraft engine of the aircraft, said second sensor starting said sensor interface and said microprocessor when the aircraft engine is turned on.

13. A passive method of monitoring a location of an aircraft and current state of the operation of the aircraft using a microprocessor mounted in the aircraft and connected to a signal receiving antenna, the microprocessor also connected to a satellite positioning system decoder and a two-way satellite communication transceiver connected to a two-way satellite communication antenna, the steps comprising:

sensing a start up of an electrical system of the aircraft using a voltage sensor, the voltage sensor adapted for connection to the electrical system, the voltage sensor connected to a sensor interface, the sensor interface connected to the microprocessor, the voltage sensor starting the sensor interface and the microprocessor for continuously operating during the operation of the aircraft;

receiving location position coordinates from a satellite positioning system using the signal receiving antenna;

decoding the position coordinates using the decoder and the microprocessor;

transmitting the position coordinates using the two-way satellite communication transceiver and the two-way satellite communication antenna to a ground-based satellite communication service via a satellite communication system;

transmitting the position coordinates from the ground-based satellite communication service to a server computer for processing the aircraft's location; and alerting an owner/operator of the aircraft using the server computer via a telecommunication system and providing non-invasive information to the owner/operator as to the aircraft's location and current state of operation.

14. The method as described in claim 13 wherein the server computer for processing the aircraft's location includes a satellite communication program adapted for receiving the position coordinates from the microprocessor and connected to the telecommunication system for alerting the owner/operator and includes a customer interface program connected to the satellite communication program, the customer interface program adapted for listening for requests from the owner/operator as to aircraft's location and current state of operation.

15. The method as described in claim 13 further including a step of sensing a start up of an engine of the aircraft using a starter contact switch, the starter contact switch adapted for connection to the engine, the starter contact switch connected to the sensor interface, the starter contact switch starting the sensor interface and the microprocessor for continuously operating during the operation of the aircraft.

* * * * *